United States Patent [19]  [11] 4,421,663
Embree et al.  [45] Dec. 20, 1983

[54] ASPHALT-OIL HEAT TRANSFER COMPOSITION

[76] Inventors: Louie G. Embree, 3528 Bell Rd., Auburn, Calif. 95603; Wayne W. Embree, Rte. 2, Box 1514, Lake Isabella, Calif. 93238

[21] Appl. No.: 264,979

[22] Filed: May 18, 1981

[51] Int. Cl.³ .............................................. C09K 5/00
[52] U.S. Cl. ..................................... 252/74; 126/400; 126/900; 165/104.19; 252/73
[58] Field of Search ...................... 252/8.5 M, 70, 74; 126/400, 900; 165/104.13, 104.19

[56] References Cited

U.S. PATENT DOCUMENTS

| | | | |
|---|---|---|---|
| 2,223,027 | 11/1940 | Dawson | 252/8.5 M |
| 2,430,039 | 11/1947 | Anderson | 252/8.5 M |
| 2,475,713 | 7/1949 | Miller | 252/8.5 M |
| 2,588,808 | 3/1952 | Dawson | 252/8.5 M |
| 2,675,353 | 4/1954 | Dawson | 252/8.5 M |
| 3,533,941 | 10/1970 | Freeland | 252/8.5 M |
| 4,170,984 | 10/1979 | Scheffee | 126/900 |

Primary Examiner—Dennis L. Albrecht
Attorney, Agent, or Firm—Lyon & Lyon

[57] ABSTRACT

A composition of matter particularly suitable for heat absorption and exchange comprising a mixture of soft commercial asphalt, oil, a finely ground heat-conductive material of high specific gravity in suspension and, in preferred embodiments, finely ground rock salt in suspension. Mineral oil is preferred as the oil. However, vegetable oil or other low-molecular-weight polymeric oils are suitable. Iron, barite, and galena of a fineness of at least 325 mesh exemplify suitable material.

26 Claims, No Drawings

ASPHALT-OIL HEAT TRANSFER COMPOSITION

BACKGROUND OF THE INVENTION

1. Field of the Invention

This invention relates to asphalt-based compositions useful for heat transfer and, more specifically, to compositions of high specific heat suitable for absorbing heat and conveying it to heat exchangers over a broad temperature range.

2. Description of the Prior Art

U.S. Pat. No. 2,252,984 discloses a compounded hydrocarbon oil, useful in heat transfer and lubrication, which may contain barium or lead. However, in the aforementioned reference, these elements are reactants and dissimilarly compounded with phosphorous in an organic matrix. Compositions of oil and graphite are also well known in the art and commercially available.

The present invention is particularly advantageous in that it presents a composition of matter which is a particularly good absorber of heat from any source, retains stability at high temperatures (in excess of 500° F.), and has advantageous flow characteristics towards conveying heat to heat exchangers. Its heat absorption and transfer capabilities are not affected by repeated heating and cooling cycles. The composition is stable and will remain suspended in a substantially homogenous state over extended periods of time while subject to use over a broad spectrum of temperature.

Although heat absorption and transfer are mentioned as particularly advantageous aspects of the present invention, it should be recognized that the invention is by no means so limited but rather encompasses the aforementioned composition insofar as it relates to a panoply of other uses.

SUMMARY OF THE INVENTION

The present invention relates to a new and useful composition of matter comprising soft asphalt mixed with mineral, vegetable or other low molecular weight polymeric oil(s), and a finely ground heat-conductive material of high specific gravity in suspension. Rock salt is a further additive to certain preferred embodiments of the invention. In one embodiment, soft asphalt is mixed with mineral oil, as well as finely ground barite and rock salt. The barite is capable of sitting in suspension for extended periods, and enhances absorption of heat by the composition. Rock salt is added to facilitate the rapid and complete exchange of heat throughout the composition.

An object of the invention is to provide a composition of matter which is stable, absorbs heat well from any source and can convey heat to heat exchangers. In this respect, it will be appreciated that the present invention provides means for absorbing heat from any source and conveying that heat to heat exchangers, and can be utilized profitably in absorbing heat, for example, from solar collectors. The accomplishment of these and other objects by the present invention will be apparent to those skilled in the art from the following description of preferred embodiments.

DESCRIPTION OF THE PREFERRED EMBODIMENTS

Generally, the present invention contemplates a mixture of soft asphalt and asphalt-miscible oil in which a finely ground heat-conductive material of high specific gravity is suspended. Finely ground rock salt in suspension is further contemplated as an additive in preferred embodiments. However, in certain contemplated embodiments containing light (low-viscosity) asphalt, the oil can be taken as superfluous.

The preferred asphalts for use are commercially available asphalts from grade AR-1000 to AR-16,000, although grades extending beyond the range indicated can be used. In particular, grades approaching and beyond AR-16,000 are useful when the present composition is to be utilized at high ambient temperatures; for the thicker asphalt flows more readily at higher temperatures, enjoys a higher flashpoint temperature than the less viscous grades, and supports suspended material well.

Preferentially, mineral oil is added, when needed, to thin the asphalt and better support the suspension of finely ground heat-conductive material of high specific gravity. Lighter asphalt and/or more mineral oil is preferential at lower temperatures and heavier (more viscous) asphalt and/or less mineral oil is suitable at higher temperatures as will be appreciated. The ability of the composition to flow within the confines of the system within which used and to maintain the aforementioned material substantially in suspension with minimal settling are the primary determinants of the permissible ranges for adding each component of the mixture. However, the following ranges and perferential mixture ratio can be taken as applicable to ambient temperatures ranging approximately between 0° and 500° F.

Soft commercial asphalt, or its equivalents, is a primary ingredient of the contemplated composition of matter, and the additive ratio of other components of the composition is dependent upon the viscosity of the asphalt. Although the ensuing gradations of viscosity of asphalt are continuous, they are conveniently categorized into three areas: soft light commercial asphalt which preferentially corresponds to commercial gradations AR-1000 to AR-4000 (but potentially extending below AR-1000), soft medium commercial asphalt preferentially corresponding to commercial gradations AR-4000 to AR-8000, and soft heavy commercial asphalt preferentially corresponding to commercial gradations AR-8000 to AR-16,000 (but potentially extending beyond AR-16,000).

Mineral oil is preferred for the mixture. However, other high-boiling oils miscible with asphalt are satisfactory. In particular, vegetable oils such as cottonseed oil, soybean oil, etc., and low-molecular-weight polymeric oils such as low-molecular-weight polyethylene are suitable. Mineral oil is preferred because of its low cost and stability over a wide temperature range.

The heat-conductive material of high specific gravity to be suspended in the mixture should be finely ground. 325 mesh is suggested as the minimum desirable level of fineness. In general, the finer the grinding the better the result in terms of suspension and heat transfer. No absolute limit can be placed on the coarseness of the suspended material. However, abrasion and settling are more apt to become factors when the suspension is less fine than the suggested 325 mesh. From a suspension standpoint, a thicker asphalt will support more coarsely ground material.

Finely ground or powdered iron, barite, or galena are preferred for the suspended material. Copper, lead, black sand, and lead oxide are also suggested as materials suitable for suspension. However, any heat-conductive material of high specific gravity which can be ground to the requisite fineness and will stay in suspension, either of itself or through the addition of additives inducing suspension can be used provided that it will remain similarly stable in suspension. Heavier materials in general are suggested to accomplish absorption of greater heat, since materials of higher specific mass will be seen to absorb more heat into a given mass. Powdered iron is believed best from a pure performance standpoint. Barite couples lower cost with acceptable performance, and galena, in particular, as well as those others mentioned, are good alternatives.

In preferred embodiments, rock salt is to be added to facilitate better penetration of heat throughout the composition and a more rapid and complete absorption of heat. The rock salt should be ground to approximately the same fineness as has been suggested for the heat conductive material of high specific gravity (e.g., iron, barite, galena, etc.). Similarly, the rock salt is to sit in suspension in the composition.

When utilizing a soft light commercial asphalt, the mixture may contain asphalt in an amount ranging from approximately 2.5% to 40% by weight. Although AR-1000 and lighter asphalt is suitable without the addition of oil, an oil may be added to light asphalt in a quantity up to approximately 30% by weight. Heat-conductive material of high specific gravity, preferentially powdered iron or finely around barite or galena, may be added in a quantity ranging between about 50% and 90% by weight. It will be appreciated that further additives may be introduced into the mixture for such purposes as promoting a state of suspended homogeneity without taking the aforementioned mixture outside the bounds of the present invention.

When utilizing a soft medium commercial asphalt, the mixture should contain an amount of asphalt ranging between approximately 2.5% and 20% asphalt by weight; a range from approximately 2.5% to 10% by weight would be appropriate for a mixture including soft heavy commercial asphalt. Oil of a nature previously set out can be added to medium grade asphalt in an amount ranging from approximately 10% to 40% oil by weight, and to heavy-grade asphalt in an amount ranging from approximately 10% to 50% oil by weight. Up to 50% by weight rock salt may be added with 10% to 40% suggested for the preferred embodiments. For medium-grade asphalt, heat-conductive material of high specific gravity can be added in an amount ranging from approximately 50% to 90% by weight; a similar range applies for heavy-grade asphalt save that the upper limit may be extended.

EXAMPLE I

At ambient room temperature, one part AR-1000 grade asphalt is mixed with four parts, by weight, of mineral oil. Fifteen parts, by weight, barite, iron or galena, ground to a fineness of at least 325 mesh is introduced into the mixture wherein it sits in substantially homogeneous suspension. Two to six parts, by weight, of rock salt ground to the same fineness as the barite, iron, or galena is similarly introduced into the mixture so as to sit in substantially homogeneous suspension. The resultant composition is introduced into a system wherein it absorbs heat from solar collectors and conveys that heat to heat exchangers. Preferentially, the system is closed to the introduction of oxygen to foreclose combustion.

EXAMPLE II

At ambient room temperature, one part medium commercial asphalt of grade AR-4000 is mixed with four parts, by weight, of mineral oil. Fifteen parts, by weight, barite ground to a fineness of at least 325 mesh is introduced into the mixture and mixed thoroughly therewith so as to attain a state of substantially homogenous suspension. The resultant composition is introduced into a system for heat exchange. Preferentially, the system is closed to the introduction of oxygen to foreclose combustion.

It should be understood that the foregoing disclosure relates to only preferred embodiments of the invention and that it is intended to cover all changes and modifications of the disclosure and example of the invention herein which do not constitute departures from the spirit and scope of the invention set forth in the appended claims.

What I claim is:

1. A heat transfer composition comprising a mixture of:

between about 2.5% and 40% by weight soft light commercial asphalt in the range of gradings between AR-1000 and AR-4000;

up to about 30% by weight of an asphalt-miscible oil; and between about 50% and 90% by weight heat-conductive material of high specific gravity.

2. The composition claimed in claim 1 wherein said heat-conductive material of high specific gravity is further defined as barite.

3. The composition claimed in claim 1 wherein said heat-conductive material of high specific gravity is further defined as selected from the group consisting of barite, iron, and galena.

4. A heat transfer composition comprising a mixture of:

between about 2.5% and 20% by weight soft medium commercial asphalt in the range of gradings between AR-4000 and AR-8000;

between about 10% and 40% by weight oil; and between about 50% and 90% by weight heat-conductive material of high specific gravity.

5. The composition claimed in claim 4 wherein said heat-conductive material of high specific gravity is further defined as barite.

6. The composition claimed in claim 4 wherein said heat-conductive material of high specific gravity is further defined as selected from the group consisting of barite, iron, and galena.

7. A heat transfer composition comprising a mixture of:

between about 2.5% and 10% by weight soft heavy commercial asphalt in the range of gradings between AR-8000 and AR-16000;

between about 10% and 50% by weight oil; and between about 50% and 90% by weight heat-conductive material of high specific gravity.

8. The composition claimed in claim 7 wherein said heat-conductive material of high specific gravity is further defined as barite.

9. The composition claimed in claim 7 wherein said heat-conductive material of high specific gravity is further defined as selected from the group consisting of barite, iron, and galena.

10. A heat transfer composition consisting essentially of:

between about 2.5% and 40% by weight soft light commercial asphalt in the range of gradings between AR-1000 and AR-4000;

up to about 30% by weight of an asphalt-miscible oil; and between 50% and 90% by weight heat-conductive material of high specific gravity.

11. A heat transfer composition consisting essentially of:

between about 2.5% and 20% by weight soft medium commerical asphalt in the range of gradings between AR-4000 and AR-8000;

between about 10% and 40% by weight of an asphalt-miscible oil; and between about 50% and 90% by weight heat-conductive material of high specific gravity.

12. A heat transfer composition consisting essentially of:

between about 2.5% and 10% by weight soft heavy commercial asphalt in the range of gradings between AR-8000 to AR-16000;

between about 10% and 50% by weight of an asphalt-miscible oil; and between about 50% and 90% by weight heat-conductive material of high specific gravity.

13. The composition claimed in claim 10, 11, or 12, wherein said heat-conductive material of high specific gravity is further defined as selected from the group consisting of barite, iron, and galena.

14. A heat transfer composition consisting essentially of:

between about 2.5% and 40% by weight soft light commercial asphalt;

up to about 30% by weight of an asphalt-miscible oil;

between 50% and 90% by weight heat-conductive material of high specific gravity; and up to about 40% by weight rock salt.

15. A heat transfer composition consisting essentially of:

between about 2.5% and 20% by weight soft medium commercial asphalt;

between about 10% and 40% by weight of an asphalt-miscible oil;

between about 50% and 90% by weight heat-conductive material of high specific gravity; and up to about 50% by weight rock salt.

16. A heat transfer composition consisting essentially of:

between about 2.5% and 10% by weight soft heavy commercial asphalt;

between about 10% and 50% by weight of an asphalt-miscible oil;

between about 50% and 90% by weight heat-conductive material of high specific gravity; and up to about 50% by weight rock salt.

17. The composition claimed in claim 14, 15, or 16 wherein said heat-conductive material of high specific gravity is further defined as selected from the group consisting of barite, iron, and galena.

18. A heat transfer composition comprising a mixture of:

between about 2.5% and 40% by weight soft light commercial asphalt;

up to about 30% by weight of an asphalt-miscible oil;

between about 50% and 90% by weight heat-conductive material of high specific gravity; and up to about 40% by weight rock salt.

19. The composition claimed in claim 18 wherein said heat-conductive material of high specific gravity is further defined as barite.

20. The composition claimed in claim 18 wherein said heat-conductive material of high specific gravity is further defined as selected from the group consisting of barite, iron, and galena.

21. A heat transfer composition comprising a mixture of:

between about 2.5% and 20% by weight soft medium commercial asphalt;

between about 10% and 40% by weight oil;

between about 50% and 90% by weight heat-conductive material of high specific gravity; and up to about 50% by weight rock salt.

22. The composition claimed in claim 21 wherein said heat-conductive material of high specific gravity is further defined as barite.

23. The composition claimed in claim 21 wherein said heat-conductive material of high specific gravity is further defined as selected from the group consisting of barite, iron, and galena.

24. A heat transfer composition comprising a mixture of:

between about 2.5% and 10% by weight soft heavy commercial asphalt;

between about 10% and 50% by weight oil;

between about 50% and 90% by weight heat-conductive material of high specific gravity; and up to about 50% by weight rock salt.

25. The composition claimed in claim 24 wherein said heat-condutive material of high specific gravity is further defined as barite.

26. The composition claimed in claim 24 wherein said heat-conductive material of high specific gravity is further defined as selected from the group consisting of barite, iron, and galena.

* * * * *